S. OTIS & W. WHITE.
SYSTEM OF WASHING AND FILLING LOCOMOTIVE BOILERS.
APPLICATION FILED AUG. 7, 1908.
Reissued Mar. 9, 1909.
12,925.
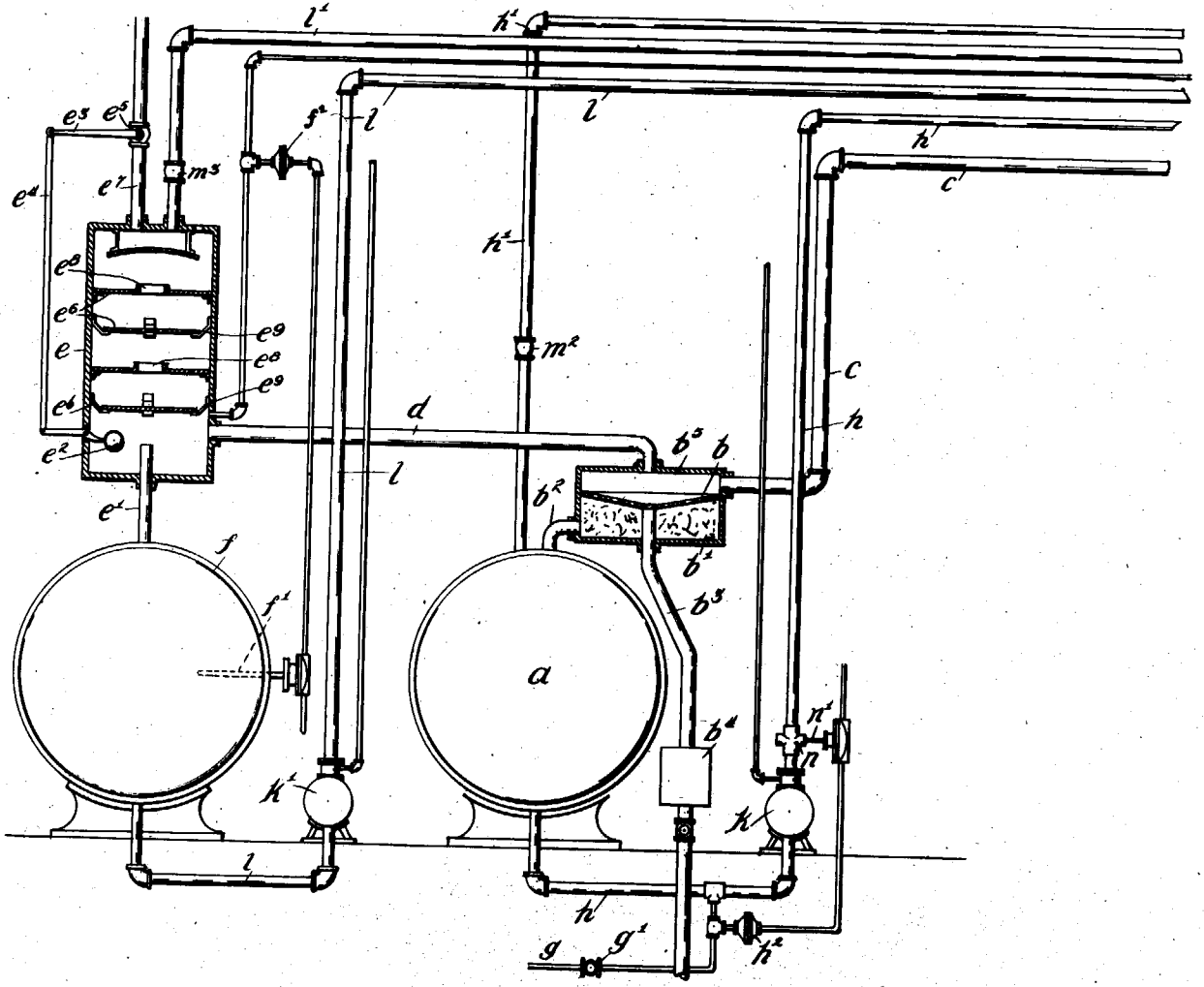
Witnesses
Milton Sinoir
E. Kernwein
Inventors:
William White,
Spencer Otis,
By Heidmann & Street
Attorneys

UNITED STATES PATENT OFFICE.

SPENCER OTIS AND WILLIAM WHITE, OF CHICAGO, ILLINOIS, ASSIGNORS TO NATIONAL BOILER WASHING COMPANY, OF CHICAGO, ILLINOIS, A CORPORATION OF MAINE.

SYSTEM OF WASHING AND FILLING LOCOMOTIVE-BOILERS.

No. 12,925. Specification of Reissued Letters Patent. Reissued March 9, 1909.

Original No. 847,386, dated March 19, 1907, Serial No. 319,909. Application for reissue filed August 7, 1908. Serial No. 447,488.

*To all whom it may concern:*

Be it known that we, SPENCER OTIS and WILLIAM WHITE, citizens of the United States, residing at Chicago, in the county of Cook and State of Illinois, have invented certain new and useful Improvements in Systems of Washing and Filling Locomotive-Boilers, of which the following is a specification.

Our invention relates to locomotive-boiler washing and filling devices; and has for one of its objects to provide a system in which the water blown from locomotive-boilers may be cleaned and the impurities therein separated therefrom and the cleaned water used for washing out boilers to remove sediment and scale therefrom.

Other objects of the invention will appear from the description hereinafter.

Our invention consists in the combinations and details hereinafter set forth and claimed.

In the drawing we have illustrated a boiler washing and filling system constructed in accordance with our invention.

In the drawings, $a$ represents a tank for receiving water blown from locomotive-boilers, which water is to be used for wash-out-water. The water from the boilers is conveyed therefrom through a suitable pipe $c$ to a filter and separator $b$, containing an upper chamber $b^5$ and a lower portion $b'$, the lower portion containing suitable filtering material. A pipe $b^3$ leads from the upper chamber $b^5$ to a sludge-receptacle $b^4$.

It will be understood that the water blown out from the boilers is mixed with steam. Upon reaching the filtering and separating devices the steam and the water are separated, the water passing through the filtering material through the pipe $b^2$ to the tank $a$. The steam passes through a pipe $d$, leading from the separator-chamber to a heating device $e$, hereinafter described.

$g$ represents a cold-water line containing a pressure-reducing valve $g'$ of any suitable construction, the function of this valve being to regulate the pressure in the cold-water line, so that it may be the same as the pressure in the washout-line, the washout-line being indicated at $h$ and leads from the wash-out-water tank to a point where the water is to be used.

$k$ is a pump, which may be of any desired type—as, for instance, a rotary pump—for forcing water from the tank $a$ to the line.

$n$ is a cross in the washout-line, and $n'$ is a thermostat in the cross. This thermostat controls a diaphragm-valve $h^2$ for regulating the amount of cold water admitted to the washout-line.

As will be readily understood, when the water in the washout-line varies from a certain predetermined temperature the thermostatically-controlled valve will operate to admit more or less cold water to the line, as may be necessary. It will be apparent that by locating the thermostatic controlling devices in the cross in the washout-line we are enabled to do away with the mixing-tank hitherto considered necessary and introduce cold water into the washout-line directly from the cold water line.

Water for filling the boiler is contained in a tank $f$, this water being conveyed to the tank through the pipe $e'$, leading from the heater $e$. Water is admitted to the upper part of the heater $e$ through a pipe $e^7$, leading from a suitable source of supply, the amount of water admitted being controlled by a float $e^2$, controlling, through suitable connections $e^4$ $e^4$, a valve $e^5$ in the admission-pipe. The heater is provided with plates $e^6$, having alternate plates having central passage-ways $e^8$ and side passage-ways $e^9$, respectively, so that the water is compelled to take a circuitous course in its travel from the top to the bottom of the heater. As before described, steam blown from the locomotive is admitted through the lower part of the heater through the pipe $d$ and rises through the heater in a direction contrary to the travel of the incoming water, which is thus heated, owing to its contact with the steam.

A heater such as above described is commonly known in this art as an "open" heater and is distinguished from the closed heater, which is sometimes used, by reason of the fact that in the open heater the steam is blown into the heating-chamber and there comes into direct contact with the incoming water, whereas in heaters of the closed type the steam is conveyed through the heating-chamber in pipes, the incoming water being heated by its contact with the heated pipes.

$f'$ represents a thermostat in the filling-water tank controlling a diaphragm-valve $f^2$ in a live-steam line. When the water in the filling-tank falls below a predetermined temperature, the thermostatically-controlled valve $f^2$ will operate to admit live steam to the heater, thus increasing the temperature of the incoming water. The filling-water is conveyed from the tank through a pipe-line $l$ to point of use, a suitable pump $k'$ operating to force the water from the tank through the line.

$h'$ represents the washout-water-circulating pipe, and $l'$ the filling-water-circulating pipe, these being arranged, as is well understood in this class of devices, to maintain a circulation of the washout and filling water, respectively. $m^2$ is a pressure-retaining valve located in the washout-water-circulating line, this valve being arranged to close when the washout-line is being used, thus maintaining a proper pressure in the washout-line. When the washout-line is not in use, this valve will open, permitting the circulation of the washout-water through the washout-discharge line $h$ back to the washout-tank through the circulation-pipes $h'$. $m^3$ is a similar pressure-retaining valve located in the circulating-line for the filling-water and acts in a similar manner to retain pressure when the filling-water line is in use. It will be understood that the pumps $k$ $k'$ operate to maintain the circulation of water in the washout and filling lines, respectively.

The operation of our system will be readily understood. It will be seen that we have provided a system in which the entire fluid contents blown out from a locomotive are separated and mingled with the washout and filling waters to heat the same, the water blown out from the boiler being filtered and mingled directly with the washout-water, while the steam after separation is conveyed to the open heater and mingled with the filling-water.

We claim—

1. A locomotive-boiler washing and filling system, comprising washout and filling water supply means, and means for separating the entire fluid contents of a locomotive-boiler and for mingling the separated contents with the washout and filling water respectively.

2. A locomotive-boiler washing and filling system, comprising a filling-water tank, a source of water-supply therefor, an open heater interposed between the tank and the source of water-supply, and means for separating the entire fluid contents of a locomotive-boiler and for conveying a part of the separated contents to the heater, wherein it is mingled with the incoming water.

3. A locomotive-boiler washing and filling system, comprising a pipe-line for conveying the blown-out contents from a locomotive-boiler, a washout-water tank connected thereto, a combined separator and filter in the pipe-line between the boiler and tank, a discharge-pipe line for conveying washout-water from the tank, and means in the discharge-pipe line for regulating the temperature of the washout-water.

4. A locomotive-boiler washer, comprising a washout-water tank, a pipe-line leading thereto, a combined filter and separator in this pipe-line, a discharge-pipe line leading from the washout-water tank, a cold-water-supply line connected to the discharge-pipe line, a thermostat in the discharge-pipe line, and a valve in the cold-water-supply line controlled by the thermostat.

5. A locomotive-boiler washing and filling system, comprising a washout-water tank, a pipe-line leading thereto, a combined filter and separator in the pipe-line exterior to the tank, said filter and separator comprising a casing having an upper chamber and a lower filtering device, a steam-pipe leading from the upper portion of the chamber, and a waste-pipe leading from the lower portion of the chamber.

6. A locomotive-boiler washing and filling system, comprising a filling-water tank, a source of water-supply therefor, an open heater interposed between the tank and the source of supply, a pipe-line leading to the heater and connected thereto at its lower end, and a combined separator and filter interposed in the pipe-line.

7. A locomotive-boiler washing and filling system, comprising a washout-water tank and a filling-water tank, a source of water-supply for the filling-water tank, an open heater between the source of water-supply and the filling-water tank, a pipe-line connected to the tank, and a combined separator and filter in the pipe-line.

8. A boiler washing and filling system, comprising means for blowing off the entire fluid contents from the boiler, means for cleaning the foul contents, and means for returning the fluid contents to the boiler as washout or filling water.

9. A locomotive-boiler washing and filling system comprising a heater, means for conveying steam blown off from the locomotive to the heater, means for admitting water to the heater, means for regulating the amount of water admitted to the heater, and means for mingling the steam and water.

10. A locomotive boiler washing and filling system comprising an open heater, means for conveying steam blown off from the locomotive to the heater, means for admitting water to the heater, and means for regulating the amount of water admitted to the heater.

11. A boiler washing and filling system comprising an open heater, means for admitting water thereto, means for conveying steam from the boiler to the open heater, means for storing said heated water, and means for conveying said heated water to the boiler.

12. A boiler washing and filling system, comprising an open heater, means within the heater for heating water by steam from the boiler, means for conveying such steam from the boiler to the heater, means for receiving said heated water, and means for conveying the heated water to the boiler.

13. A boiler washing and filling system comprising means for receiving the blown-off contents of a boiler, means intermediate of the boiler and said receiving-means for cleaning the contents, and means for returning the cleaned contents to the boiler.

SPENCER OTIS.
WILLIAM WHITE.

Witnesses:
FLORENCE LAIRD,
J. V. MAURER.